US008280193B2

(12) United States Patent
Weiss et al.

(10) Patent No.: US 8,280,193 B2
(45) Date of Patent: *Oct. 2, 2012

(54) METHOD AND APPARATUS FOR MAGNIFYING COMPUTER SCREEN DISPLAY

(75) Inventors: Benjamin D. Weiss, Dorset, VT (US); Richard W. Demar, Manchester Center, VT (US); Jost M. Eckhardt, Pawlet, VT (US)

(73) Assignee: Algorithmic Implementations, Inc., Manchester Center, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/045,299

(22) Filed: Mar. 10, 2011

(65) Prior Publication Data

US 2011/0164061 A1    Jul. 7, 2011

Related U.S. Application Data

(63) Continuation of application No. 12/358,935, filed on Jan. 23, 2009, now Pat. No. 7,912,322, which is a continuation of application No. 11/031,424, filed on Jan. 6, 2005, now Pat. No. 7,483,592.

(51) Int. Cl.
*G06K 9/32*    (2006.01)
*G06F 15/00*    (2006.01)
*G09G 5/00*    (2006.01)

(52) U.S. Cl. .......................... 382/298; 358/1.2; 345/660

(58) Field of Classification Search .......... 382/298–301, 382/305, 312; 345/156, 472, 660, 661; 358/1.11, 358/1.2, 3.12, 528

See application file for complete search history.

(56) References Cited

U.S. PATENT DOCUMENTS

| | | | |
|---|---|---|---|
| 4,808,987 A | 2/1989 | Takeda et al. | |
| 5,042,075 A | 8/1991 | Sato | |
| 5,586,196 A | 12/1996 | Sussman | |
| 5,754,873 A | 5/1998 | Nolan | |
| 6,073,036 A | 6/2000 | Heikkinen et al. | |
| 6,169,547 B1* | 1/2001 | Tanaka et al. | 715/838 |
| 6,363,395 B1* | 3/2002 | Tanaka et al. | 1/1 |
| 6,577,291 B2* | 6/2003 | Hill et al. | 345/89 |
| 6,968,502 B1 | 11/2005 | Kubomura et al. | |
| 7,073,128 B2 | 7/2006 | Lloyd-Jones et al. | |
| 7,190,379 B2* | 3/2007 | Nissen | 345/660 |
| 7,194,697 B2 | 3/2007 | Sinclair et al. | |
| 7,212,210 B2 | 5/2007 | Cooper | |
| 7,222,306 B2* | 5/2007 | Kaasila et al. | 715/801 |
| 7,287,220 B2* | 10/2007 | Kaasila et al. | 715/201 |

(Continued)

FOREIGN PATENT DOCUMENTS

EA            1211631 A1    6/2002

(Continued)

OTHER PUBLICATIONS

Non-Final Office Action (dated Apr. 28, 2010), U.S. Appl. No. 12/358,935, filed Jan. 23, 2009, (8 pages).

(Continued)

*Primary Examiner* — Kanjibhai Patel
(74) *Attorney, Agent, or Firm* — Blakely, Sokoloff, Taylor & Zafman LLP (57) ABSTRACT

A screen magnification tool to scale the content of a computer display screen by distinguishing text and non-text elements of the content and applying different scaling methods to the text and non-text elements. Information about the text elements is stored in a database. Other embodiments are also described.

11 Claims, 7 Drawing Sheets

U.S. PATENT DOCUMENTS

| | | |
|---|---|---|
| 7,379,053 B2 | 5/2008 | Schaefer |
| 7,483,592 B2 | 1/2009 | Weiss et al. |

FOREIGN PATENT DOCUMENTS

| | | |
|---|---|---|
| JP | 2002165079 | 6/2002 |
| JP | 2004096574 | 3/2004 |

OTHER PUBLICATIONS

"Complaint". In re *Algorithmic Implementations, Inc., dba Ai Squared* v. *Issist Assistive Technologies, Inc.*, United States District Court for the District of Massachusetts, Civil Action No. 09-10551 (Case 1:09-cv-10551, Document 1, Filed Apr. 9, 2009), (3 pages).

Non-Final Office Action (dated Dec. 31, 2007), U.S. Appl. No. 11/031,424, filed Jan. 6, 2005, First Named Inventor: Benjamin D. Weiss, (9 pages).

"ZoomText 8.1 Magnifier Features", Ai Squared ZoomText 8 Magnifier Features, Internet page, Apr. 20, 2005, http://www.aisquared.com/Products/ZoomText8_mag/Featur . . . , (3 pages).

Non-Final Office Action (dated Jul. 22, 2009), U.S. Appl. No. 12/358,935, filed Jan. 23, 2009, (9 pages).

Examination Report dated Jul. 15, 2009, GB Application No. 0525543.5, (2 pages).

Blenkhorn, P., et al., "Full-Screen Magnification for Windows Using DirectX Overlays", IEEE Transactions on Neural Systems and Rehabilitation Engineering, vol. 10, No. 4, (Dec. 2002), (pp. 225-231).

Evans, G., et al., "Architectures of assistive software applications for Windows-based computers", Journal of Network and Computer Applications, 26, (2003), (pp. 213-228).

\* cited by examiner

METHOD AND APPARATUS FOR MAGNIFYING COMPUTER SCREEN DISPLAY

RELATED MATTERS

This is a continuation application of Ser. No. 12/358,935, filed Jan. 23, 2009, entitled "Method and Apparatus for Magnifying Computer Screen Display" (currently pending), which is a continuation of Ser. No. 11/031,424, filed Jan. 6, 2005, which issued as U.S. Pat. No. 7,483,592 on Jan. 27, 2009.

BACKGROUND

Some embodiments of this invention concern the preparation of magnified images for presentation on a computer display, where textual information present in the magnified image has superior contrast and improved letter shapes, and is generally more legible. Other embodiments are also described.

Computer displays are commonplace, and are used to present a wide range of textual and graphical information. The active portion of a display is typically rectangular and substantially planar. An array of colored spots, or pixels (for "picture elements"), is usually used to present the data. A process known as rasterization is performed to convert data to be displayed from its native format into an appropriate array of pixels to be included on the display. The native format may be, for example, endpoints of line segments, parameterized curves, and text encoded according to a standard such as ASCII or Unicode. In accordance with common software engineering practice, the term "pixel" will be used herein to refer to both the colored spot visible on a display screen and the representation in computer memory of data which, when operated on by the appropriate combination of hardware and software, will cause the colored spot to appear on a display screen.

Pixels on a display can often be displayed in varying color or brightness, but cannot be displaced from the points of the array. These points are regularly spaced in X and Y directions at an interval known as the display's resolution. Resolutions are often measured in dots per inch, or DPI. Ordinary display screens generally have a resolution between a few tens and a few hundreds of dots per inch. Screens intended for viewing from a greater distance may have pixels that are physically larger, but at the intended viewing distance, the larger pixels may subtend a similar visual angle as the smaller pixels of an ordinary screen (when viewed from a shorter distance). Large and small screens, viewed from the intended distance, can therefore provide an overall similar impression for the viewer.

Because pixels are at fixed locations on the screen, it is often impossible to rasterize a line or curve in such a way that pixels lying precisely on the intended path can be selected for activation. When no pixel lies exactly on the path, one or more of the nearest pixels are generally selected for activation during rasterization. The selected pixel may be set to a different color or brightness to improve the overall appearance of the rasterized path; this technique is known as anti-aliasing. However, the selection of pixels that are off the true path results in a rasterized image that contains errors and distortions. Since pixels are usually quite small, the errors are also negligible in most cases, but they can become important in some circumstances.

Paths with features that are smaller than a single pixel, or complicated features that must be rasterized and represented by only a few pixels, are especially susceptible to distortion during rasterization. Display of text data presents particular problems in this regard: characters are often displayed at a height of only ten or twelve pixels, and many letters have small features that are very important in helping a reader to distinguish similar shapes. (Consider, for example, the differences between the letters O and Q and the numeral 0.) Various techniques have been developed to improve readability of text presented at modest sizes, since the alternate approach of simply making the text larger has the detriment of reducing the amount of information that can be presented simultaneously on a screen.

Currently, most text presented on display screens is drawn using either a bitmap font or an outline font. A bitmap font is a collection of characters pre-rasterized at a height of a particular number of pixels; the bitmaps are often carefully tuned to be legible at that size. Unfortunately, since screen resolutions and therefore pixel sizes vary over a moderate range, text presented using bitmap characters will also vary in size. This is unacceptable in many common situations, such as in a "what-you-see-is-what-you-get" (WYSIWYG) text editor. Furthermore, bitmap fonts do not scale smoothly at other than integral magnifications (that is, magnifications by a factor of a whole number such as 2, 3 or 4), and even at integral magnifications, the characters often become difficult to read.

Outline fonts, by contrast, contain characters described as collections of lines and curves. The collections are represented in measurement-independent coordinates, so they can be scaled smoothly to any desired size. After scaling, the characters can be rasterized and displayed. This method works well for all but very small text sizes, and is in wide use.

Information to be presented on a computer display is often prepared by an application program. Information from a number of different applications is commonly presented simultaneously on a single display. In a common arrangement, each application is unaware of the others, and simply transmits its own display requests to one or more separate software tasks that receive all the requests and manage allocation of portions of the physical display so that each application can present some of its information. In this common arrangement, the applications convert their high-level information into requests to draw on the screen, but are unconcerned with the conversion of the requests into pixels on the display, while the display manager receives a sequence of drawing requests and causes the appropriate pixels to be activated but is unaware of the high-level information that the drawing requests represent.

If it is desired to magnify the image displayed on a screen, as done by conventional screen-magnifier software tools used by the visually impaired, each displayed pixel is magnified and then a portion of the magnified image is re-sampled to obtain new pixel values for display. Unfortunately, this approach magnifies any errors that occurred during the rasterization of the original drawing requests, and the particular susceptibility of text to rasterization errors may cause magnified text to become ugly and even illegible.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
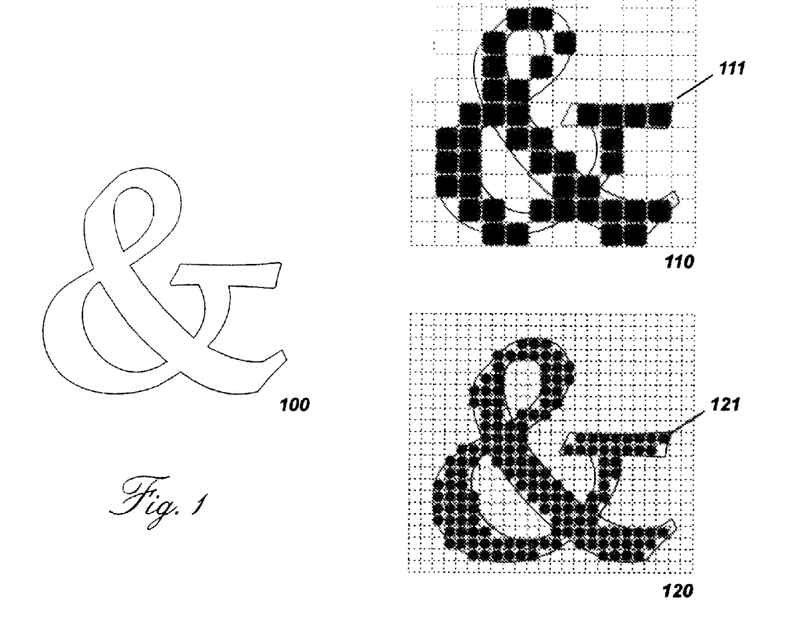
FIG. 1 shows an outline of a character, and the same character rasterized at two different resolutions.

FIG. 1 shows an outline of an ampersand character 100, and the same character converted to an array of pixels at two different ratios of character size to pixel size (110, 120). At the lower ratio 110, the character is rasterized into a 12×11 array of pixels; while at the higher ratio 120, the character is rasterized into a 24×22 array of pixels. A comparison of the two characters shows that the larger pixels 111 (relative to the size of the character) of the lower-resolution rasterization produce a poorer approximation of the outlined character than do the smaller pixels 121 of the higher-resolution rendering. The errors between the desired outline and the activated pixels are more pronounced in the lower-resolution version, but even the higher-resolution pixel map contains areas inside the outline that are not filled, and areas outside the outline that contain portions of activated pixels.

The errors arise because many pixels do not lie entirely inside or outside the outline. For those pixels, a heuristic is used to determine whether or not the pixel should be activated. For example, a pixel might be activated if at least 50% of the pixel's area lies within the outline. Alternatively, a pixel might be shaded so that its color, brightness or saturation is proportional to the amount of the pixel's area that lies within the outline. Note that most errors cause the boundaries of the displayed character to vary by less than a pixel's dimension from the true outline. This is true regardless of the size of the pixel relative to the size of the character. Thus, rendering errors may be reduced by rendering the character at the largest practical ratio between the size of the outline and the size of the pixel. However, rendering text at a multiple of the final resolution and then scaling down to the final resolution (a technique known as super-sampling) requires additional memory and processing time, and may not produce commensurate improvements in legibility as compared with other heuristics for rendering text. For most purposes, the "largest practical ratio" is simply the final desired pixel resolution.

Figure 2:
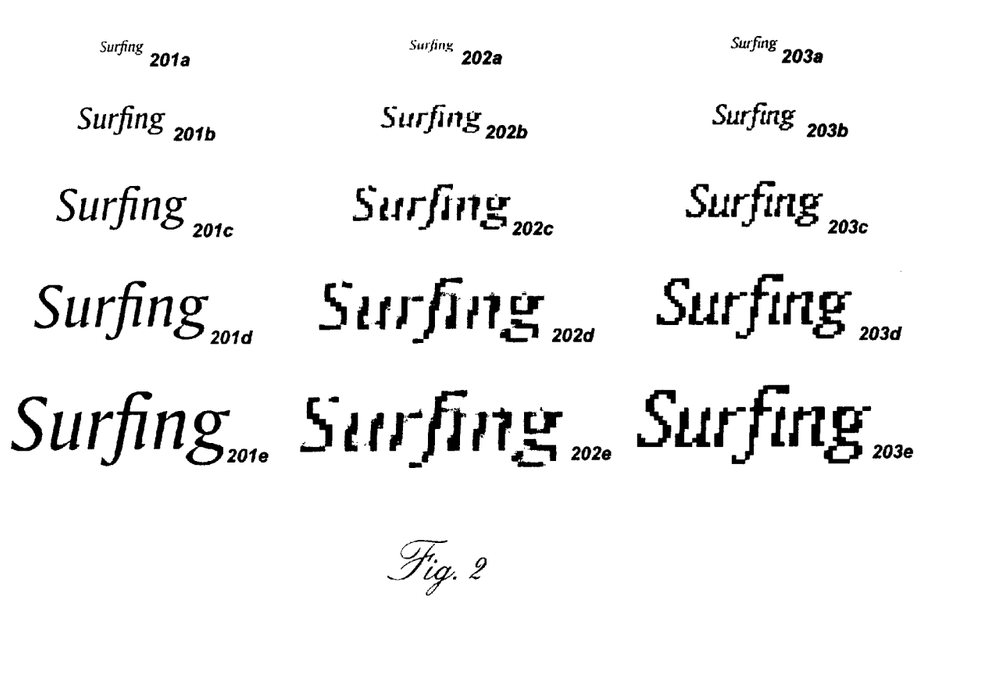
FIG. 2 shows a word printed in outline, anti-aliased bitmap, and bitmap fonts; each word is magnified a number of times to show the effect of error accumulations.

FIG. 2 shows a word printed at 12 points in an outline font 201a, an anti-aliased font 202a, and a bitmap font 203a. Below each of those, the same word is printed at successively larger magnifications. It is apparent that only the outline font can be magnified smoothly; the anti-aliased and bitmap fonts contain rasterizing errors that, although invisible or inoffensive at the small size, become increasingly pronounced at larger sizes (202b-e, 203b-e), and result in impaired legibility despite the larger size.

Figure 3:
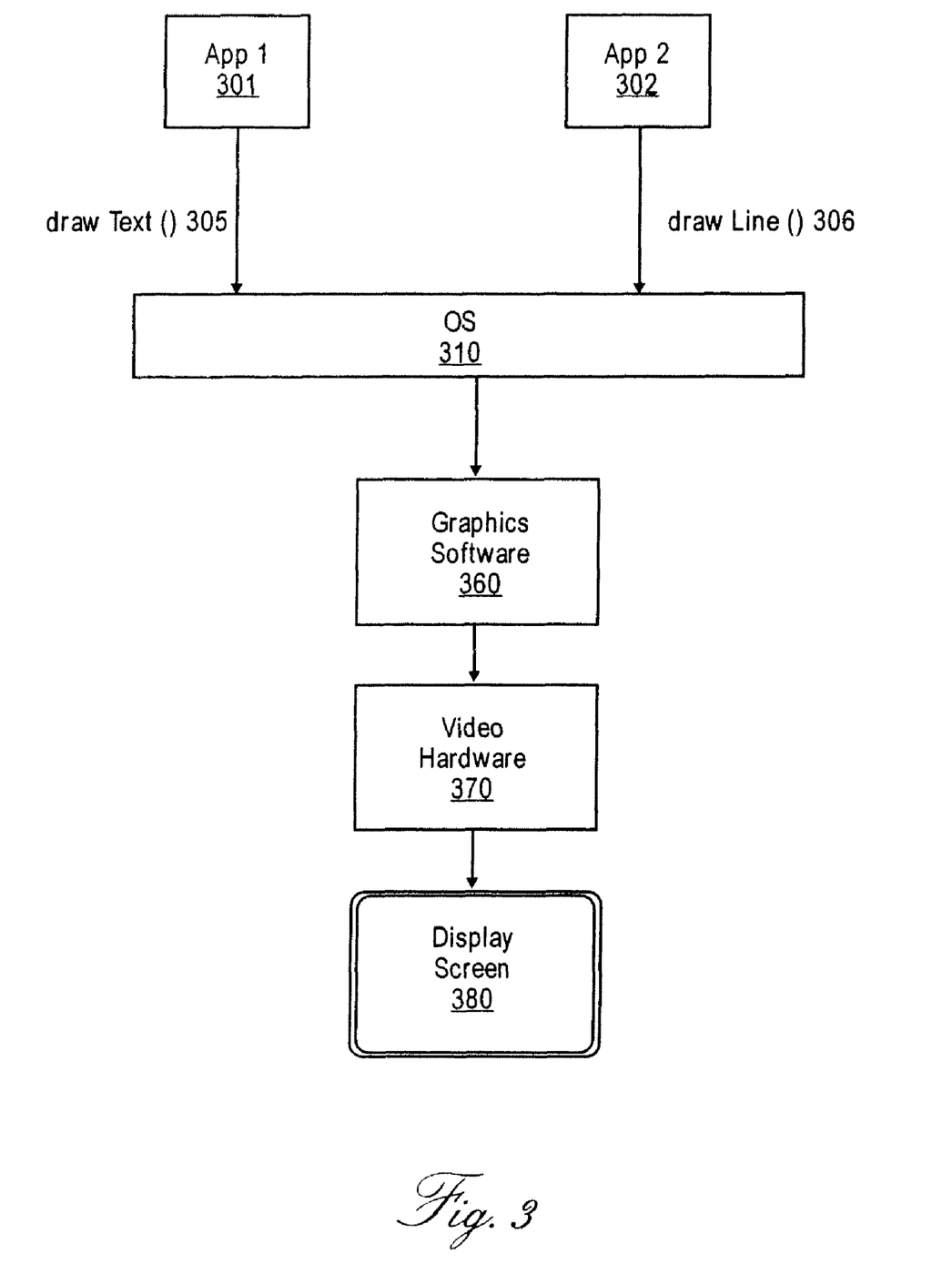
FIG. 3 shows a conceptual flowchart of the processes involved in producing a typical computer display.

FIG. 3 shows a conceptual flowchart of the processes typically involved in producing an image for presentation on a computer display. Application programs 301 and 302 issue requests 305 and 306 to draw information on the screen. In this flowchart, the requests are shown as simple subroutine calls that are eventually received by operating system (OS) 310. In some systems, the requests may be transmitted through an interprocess communication mechanism to a different application program running on the same computer, or over a wired or wireless network to a program running on a different computer.

The receiver of the drawing requests usually manages the allocation of pixels on the screen and prevents one application from disturbing another application's display, but is unaware of the high-level information that the drawing requests represent. This division of functions between application program and display manager has proven to be useful and flexible, but has the disadvantage that there is no convenient way to work backwards from pixels on the screen to determine what high-level information, or even what drawing request, caused the pixel to be activated. Any information about the true path sought to be represented by a drawing request is lost during rasterization; the pixels no longer contain error information to show how far they are from the true path.

In the illustrated system, OS 310 passes the drawing requests to a chain of cooperating software and hardware modules represented by elements 360 and 370. Software modules in this chain are often referred to as "drivers," and so the chain may be called the "video driver chain." The software and/or hardware modules rasterize the requests and prepare a pixel map for display. Eventually, video hardware 370 produces a signal, such as a VGA signal, that is sent to the display screen 380. The signal causes the screen to present an approximation of the drawings requested by the application programs.

Figure 4A:
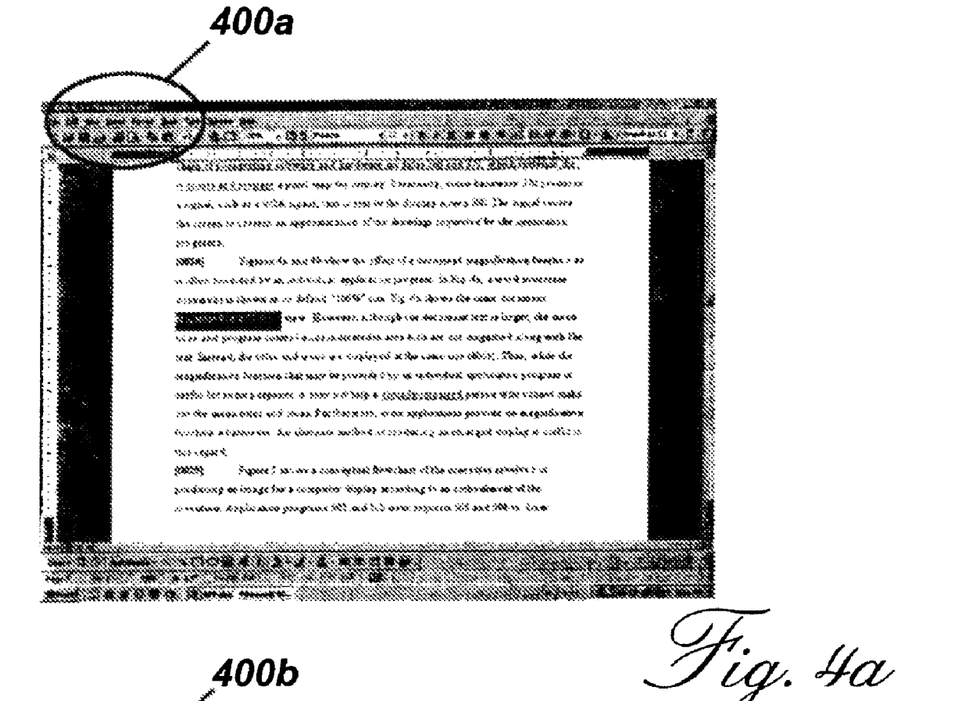
FIGS. 4a and 4b show the effect of an application-provided magnification function.
Figure 4B:
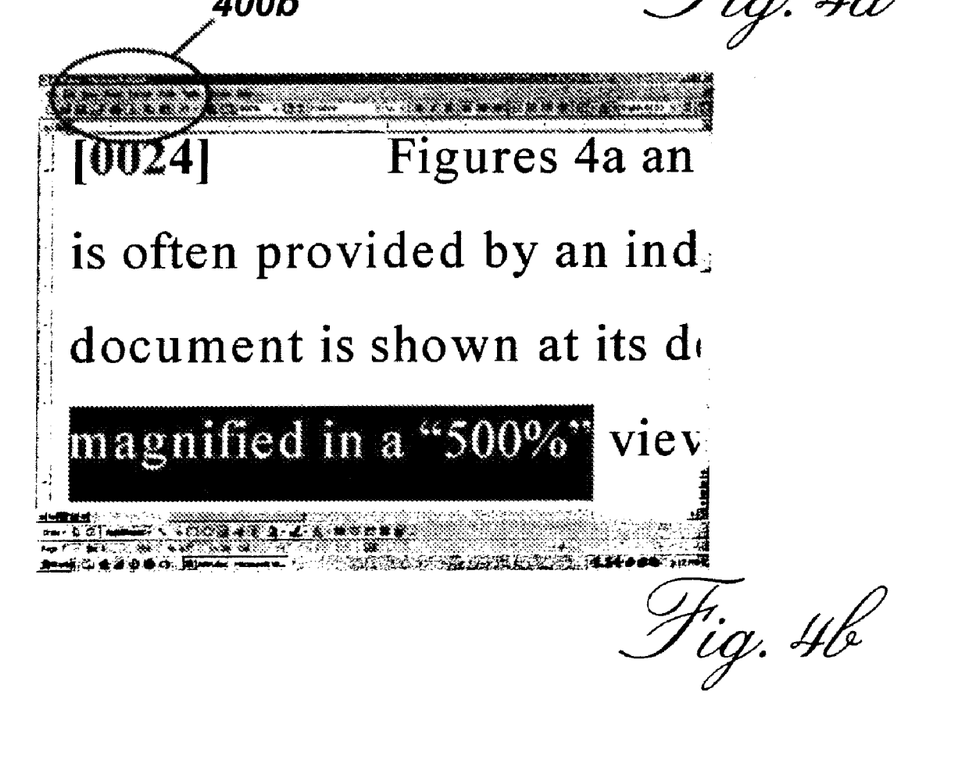

FIGS. 4a and 4b show the effect of a document magnification function in a display screen window, such as is often provided by an individual application program. In FIG. 4a, a word processor document is shown at its default "100%" size. FIG. 4b shows the same document magnified in a "500%" view. However, although the document text is larger, the menu titles and program control icons indicated in area 400a are not magnified along with the text. Instead, the titles and icons are displayed at the same size (400b). Thus, while the magnification function that may be provided by an individual application program is useful for some purposes, it does not help a visually-impaired person who cannot make out the menu titles and icons. Furthermore, some applications provide no magnification function whatsoever. An alternate method of producing an enlarged display is useful in this regard.

Figure 5:
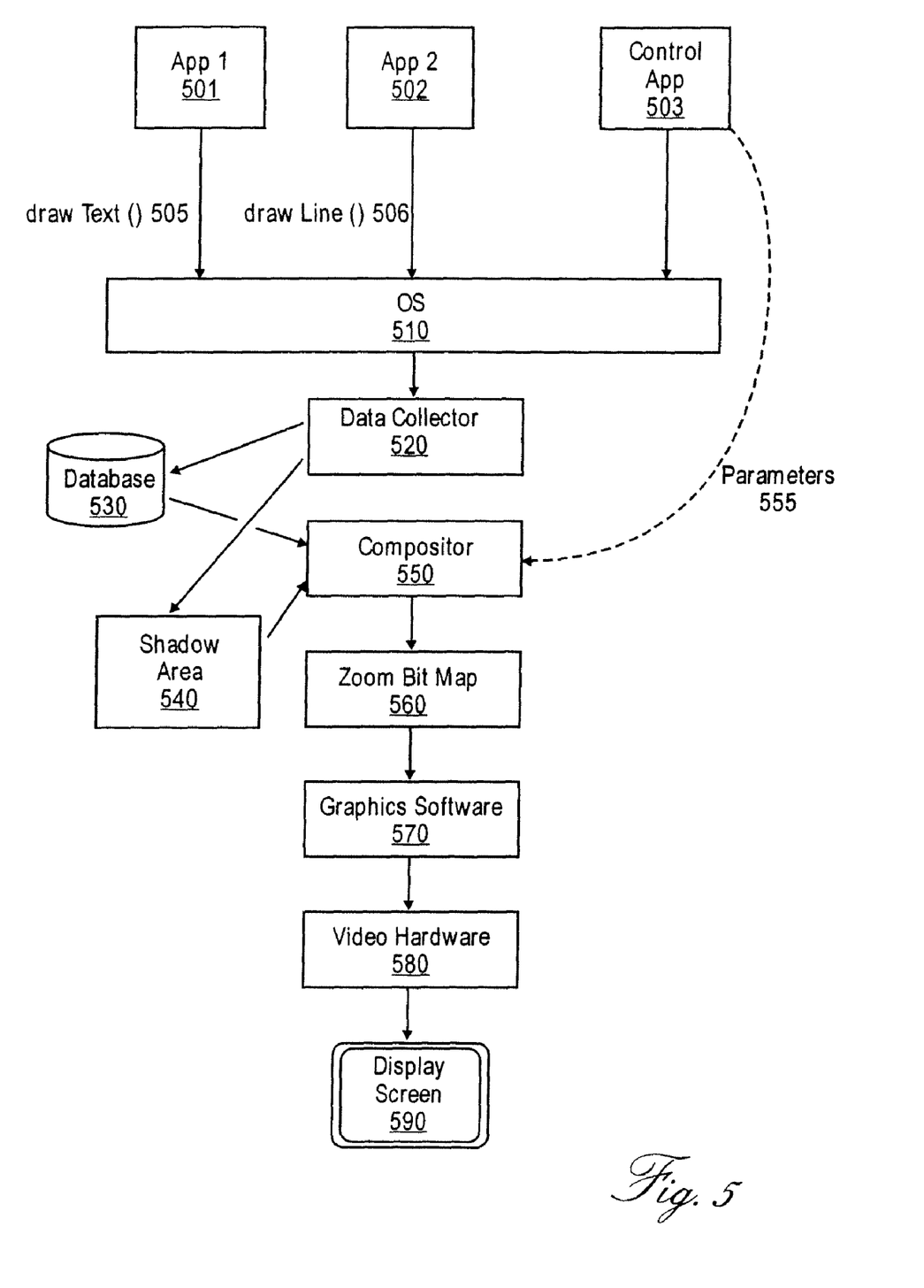
FIG. 5 shows a conceptual flowchart of the processes involved in producing an image for computer display according to an embodiment of the invention.

FIG. 5 shows a conceptual flowchart of the processes involved in producing an image for a computer display according to an embodiment of the invention. Application programs 501 and 502 issue requests 505 and 506 to draw information on the screen. In the illustrated embodiment, the requests are made by simple subroutine calls that are eventually received by operating system 510. In other embodiments, the requests may be transmitted through interprocess communication to a different application program running on the same computer, or over a wired or wireless network to a program running on a different computer.

The requests are passed to a chain of cooperating software and hardware modules 520, 550, 570 and 580, which perform operations detailed below. Where the OS is software produced by Microsoft Corporation, the chain of cooperating modules can be manipulated with functions provided by the Driver Chain Manager (DCM) libraries. When a DCM-enabled module (or set of modules) is inserted into the chain of cooperating modules, it (or they) will receive function calls including, for example, DrvTextOut( ): a command to draw standard text on the screen, DrvBitBlt( ): a command to draw standard graphics (i.e. non-text elements) on the screen, and DrvCopyBits( ): a command to perform standard copies to the screen. These function calls are "hooks" that a module can use to trigger special processing in response to graphic operations requested by an upper-layer entity (e.g. application programs 501 and 502 or OS 510).

Once inserted into the driver chain, modules implementing an embodiment of the invention can perform the following operations. Data collector 520 separates requests to draw text from requests to draw other figures and stores information about the requests in database 530. Data collected may include the location, color, transparency, and extent of the figure to be drawn. In the case of requests to draw text, data collector 520 also stores information such as the requested font, size, and orientation, as well as the requested text itself. The text is typically represented by bytes or words in ASCII, Unicode, or another common encoding system, and stored in that format, or in an equivalent encoded form. The data collector may also cause non-text drawing requests to be rasterized into shadow area 540. The shadow area may be separate from the pixel map that video hardware 580 converts to a signal and transmits to display screen 590, so that changes to the shadow area are not immediately reflected on the screen.

Database 530 can be any memory or disk structure in which information can be stored for later retrieval. It need not be a full-featured relational database with search, statistics, and other advanced capabilities. The term "database" as used herein simply means a storage area where data can be stored for future use.

Compositor 550 takes information from database 530, pixels from shadow area 540, and a set of parameters 555 communicated from a control application 503, and composes a zoom pixel map 560. The parameters include magnifications, translations, and other alterations (such as color or contrast changes) that may have been requested by the computer's user. These parameters control the composition and rendering of the zoom pixel map 560. The zoom pixel map is made available to the remaining modules in the driver chain, graphics software 570 and video hardware 580. The latter modules (570 and 580) represent the video driver chain before it is augmented by modules 520 and 550 (and associated elements 530, 540 and 560), which implement an embodiment of the invention. Since the zoom pixel map contains the magnified, translated, and otherwise altered image, the signal eventually produced by the video hardware will cause the display screen to present the modified image.

Figure 6:
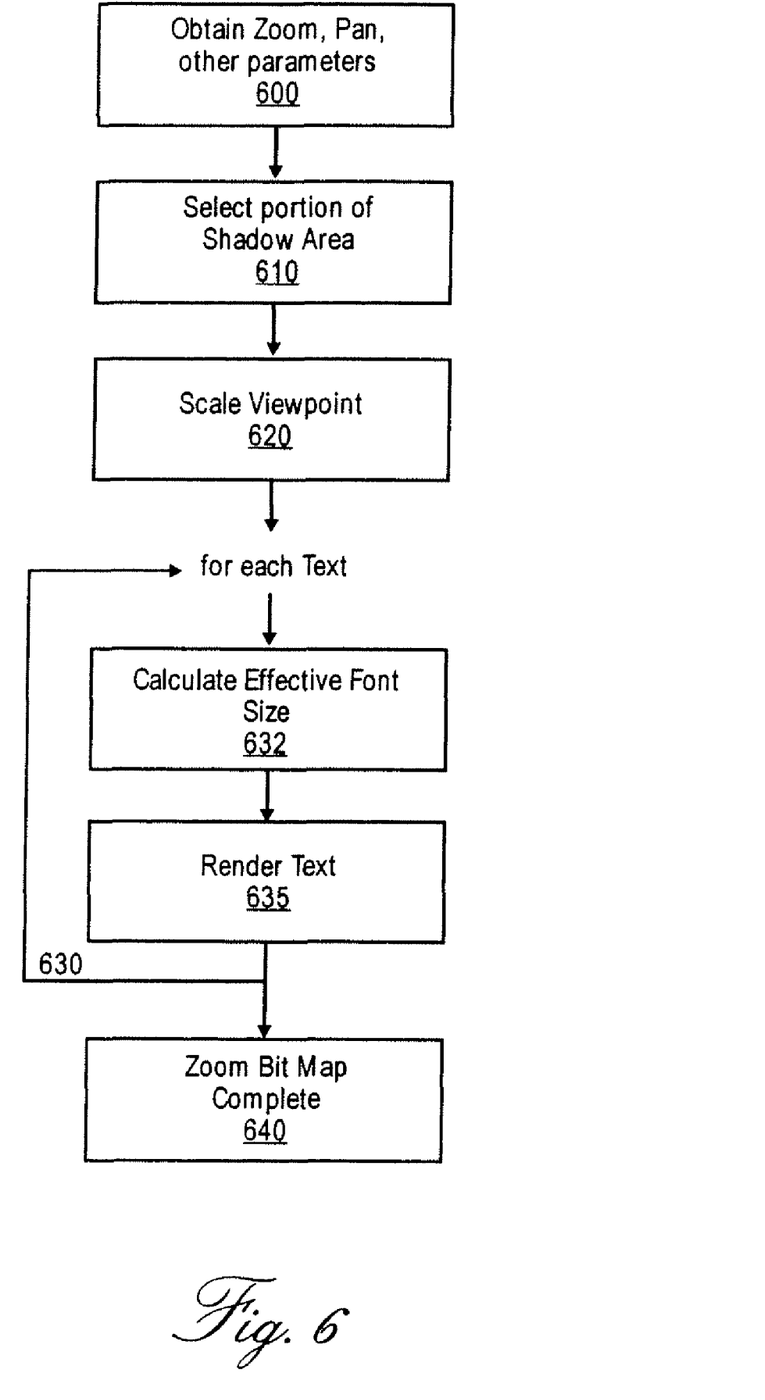
FIG. 6 provides greater detail concerning one of the elements of FIG. 5.

FIG. 6 provides another conceptual flowchart that details the functions performed by the compositor. First, this subsystem obtains zoom, pan, and other parameters from sources including an application program designed to control the display magnification system (600). The zoom (or magnification) parameter controls the level of magnification to be applied to the shadow area before it is sent to the remainder of the video output chain. If the magnification is greater than one, then the shadow area will be larger than the space available on the physical display screen, and so only a portion of the shadow area can be presented. This portion is called the viewport. To select the viewport, pan coordinates are used. The two-dimensional pan coordinates locate a point of the shadow area that will be present on the final display screen. Often, this point will be one of the four corners of the rectangular viewport, but any other point may be used instead. For example, the pan coordinates may select the center of the viewport, instead of one of the corners. One intuitive method of permitting the user to select the viewport is to connect the pan coordinates to the movement of an input device such as a mouse. When the user moves the mouse, the viewport is shifted so that the mouse cursor always remains within its boundaries.

The zoom and pan parameters are sufficient to allow the compositor to select a portion of the shadow area (610). This portion is magnified in accordance with the zoom parameter and re-sampled at the physical screen pixel dimensions (620) to produce a zoom pixel map. The magnification and re-sampling may incorporate anti-aliasing or other techniques to improve the clarity of the image. Note that the shadow area does not contain active pixels corresponding to text drawn by application program requests, and therefore the magnification does not introduce the sorts of errors that render such text less legible or illegible. Instead, once the zoom pixel map is prepared, the text strings stored in the database are rasterized or rendered directly into the map in loop 630. For each string, an effective font size (taking into account the originally-requested font size and the magnification factor) is calculated (632) and then the text is rendered in the requested font, color, location, and orientation (635). If the requested font is an outline font, then rendering the text involves scaling the character outlines to the effective font size and activating pixels lying within the scaled outlines. After this loop completes, the zoom pixel map contains an image suitable for display (640). The image combines the magnified viewport with the rasterized text.

According to this embodiment of the invention, all the elements of the displayed image are magnified (including items such as command icons), and all text elements are rasterized directly at their final display sizes, rather than being rasterized at a smaller size and then magnified. Therefore, errors in the rendering of text are limited to the smallest number of screen pixels possible given the combination of font (outline or bitmap), text size, and use of appearance-improving techniques such as sub-pixel hinting and font anti-aliasing. Furthermore, another display of a different viewport or magnification of the same overall display can be prepared according to an embodiment of this invention, and that second display will also have any errors in the rendering of text minimized as described above. In this manner, the visual quality and legibility of text is greatly improved under arbitrary magnifications.

Figure 7:
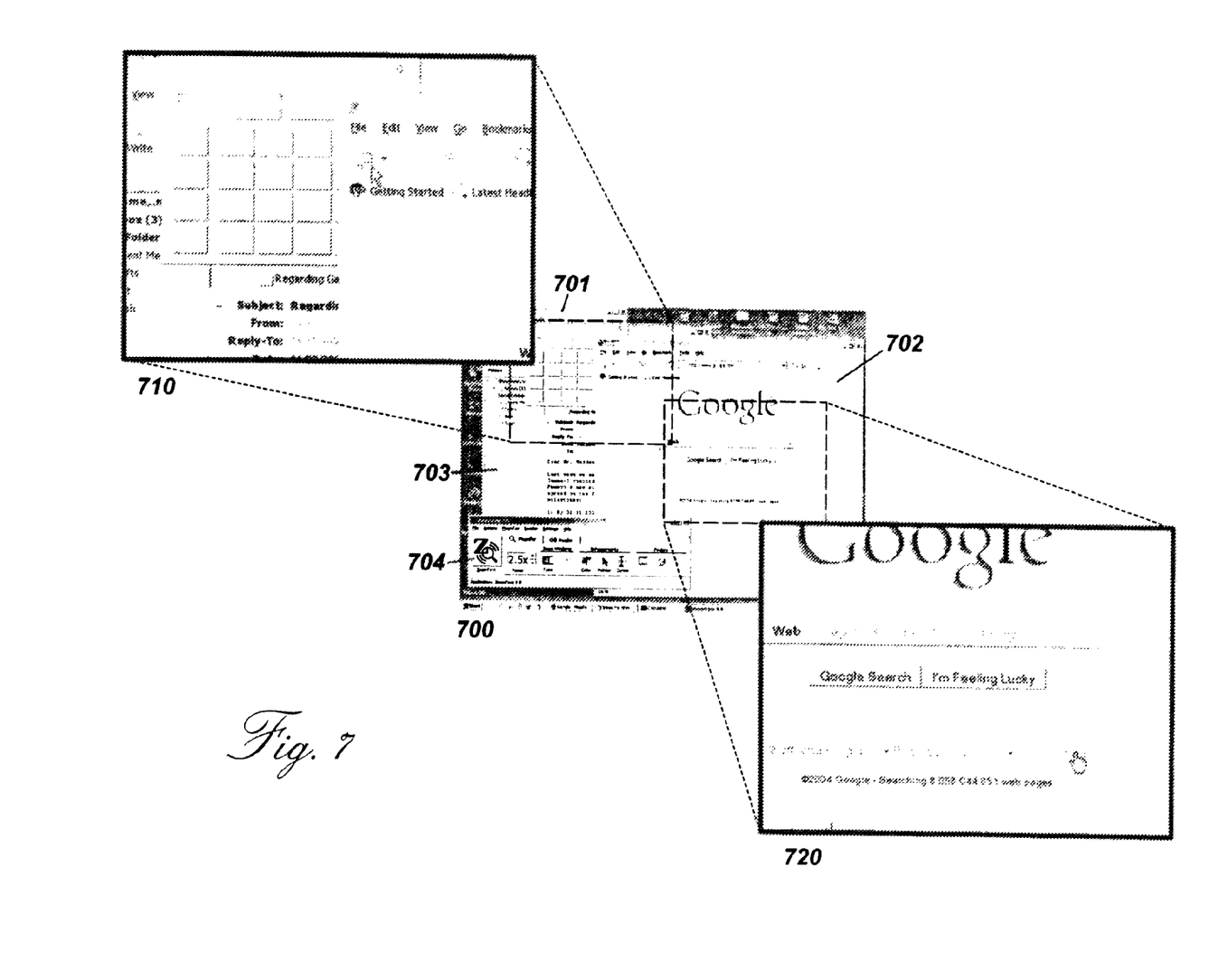
FIG. 7 shows one way that a portion of a screen may be selected for magnification.

FIG. 7 shows a full-screen display 700 with several applications visible, including calculator 701, web browser 702, electronic mail client 703, and screen magnification control application 704. Some computer systems distinguish between "active" and "inactive" applications; an "active" application is the one with which the user is currently interacting. However, both active and inactive applications may produce output to be displayed on the screen. Magnified images 710 and 720 show the magnified contents of two different viewports; in 710, an area near the top left of the full-screen display has been selected and displayed at 2.5 times magnification, while in 720, an area near the lower right of the display has been selected. Note that magnified viewports show enlarged versions of all the displayed information, and not just the information related to the active application.

The screen magnification control application 704 may permit the user to set (or change) display parameters such as the magnification level, display contrast, colors, and cursor shape.

Figure 8:
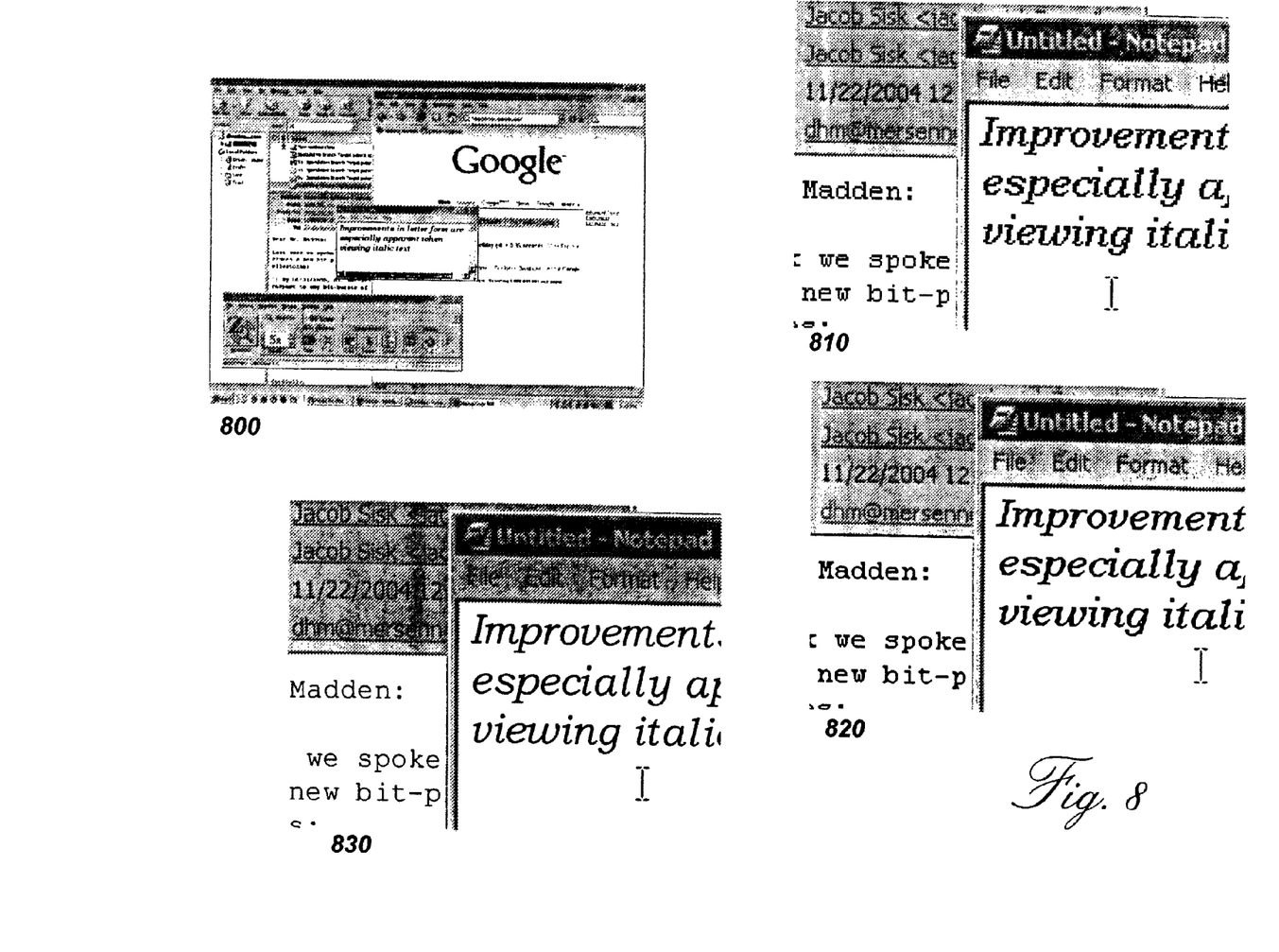
FIG. 8 shows a comparison between the results of two conventional methods of producing a magnified screen display and an embodiment of the invention disclosed herein.

FIG. 8 shows a comparison between the method of one embodiment of the present invention and two conventional methods of displaying magnified screen contents. 800 shows the full screen display, while 810 shows a portion magnified by simple pixel scaling, and 820 shows the same portion magnified by pixel scaling with smoothing applied. Neither 810 nor 820 incorporate separate text handling, so distortions in text resulting from magnifying errors in the characters rendered at an unmagnified size are apparent. Note particularly the text near the mouse cursor. In 810, the large blocks of the magnified pixels are clearly apparent. In 820, the text is somewhat easier to read because a smoothing algorithm has been applied, but the edges of the letters are still uneven. Magnified portion 830 shows the same area with text rendered separately at the magnified size, according to an embodiment of the method herein disclosed. Note that the letters near the cursor (as well as other letters visible on the screen) are smooth and well-proportioned. The improvement in text quality is readily apparent.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that magnified displays can also be produced by software and hardware that distribute the functions of embodiments of this invention differently than herein described. Such variations and implementations are understood to be apprehended according to the following claims.

What is claimed is:

1. A non-transitory computer-readable medium containing instructions that, when executed by a processor, cause the processor to perform operations comprising:
    in response to receiving a drawing command that normally causes non-text elements to be drawn, drawing the non-text elements into a shadow area;
    in response to receiving a drawing command that normally causes text elements to be drawn, storing the text elements in a database; and
    producing a screen image by combining the text elements with a portion of the shadow area containing the non-text elements.

2. The non-transitory computer-readable medium of claim 1, wherein the screen image is a first screen image produced by rasterizing text elements stored in the database according to a first set of screen parameters and combining the rasterized text elements with a first portion of the shadow area, the medium containing instructions that, when executed by the processor, cause the processor to perform further operations comprising:
    producing a second screen image by rasterizing text elements stored in the database according to a second set of screen parameters and combining the rasterized text elements with a second portion of the shadow area.

3. The non-transitory computer-readable medium of claim 1, wherein producing the screen image includes rasterizing the text elements, wherein rasterizing text elements comprises scaling a character of an outline font to a calculated size and activating pixels according to a location of the pixels relative to the scaled character.

4. The non-transitory computer-readable medium of claim 1, wherein producing the screen image is performed according to a set of screen parameters, wherein the set of screen parameters includes a magnification level, the computer-readable medium containing instructions that, when executed by the processor, cause the processor to perform further operations comprising altering the magnification level in the set of screen parameters.

5. The non-transitory computer-readable medium of claim 1 wherein the set of screen parameters includes a pan origin, the computer-readable medium containing instructions that, when executed by the processor, cause the processor to perform further operations comprising altering the pan origin in the set of screen parameters.

6. The non-transitory computer-readable medium of claim 5 wherein altering the pan origin is performed in response to an input of a user of the processor.

7. A method comprising:
    receiving through a first subroutine call a first plurality of parameters describing a first desired modification of a display presented by a screen device, where the first desired modification does not include rendering at least one character;
    storing information about the first desired modification in a first memory location;
    receiving through a second subroutine call a second plurality of parameters describing a second desired modification of the display presented by the screen device, where the second desired modification is rendering at least one character;
    storing the at least one character in a second memory location;
    producing an image according to a set of display parameters, the image composed of at least a portion of the information in the first memory location and a pixel map; and
    displaying the image on the screen device.

8. The method of claim 7, further comprising:
    altering the set of display parameters;
    repeating the rendering operation according to the altered set of display parameters; and
    repeating the displaying operation.

9. An article of manufacture comprising:
    a screen magnification tool to scale an entire content being displayed on a computer screen by distinguishing text and non-text elements in the content and applying different scaling methods to said text and non-text elements so that the text elements are displayed in accordance with information stored in a database.

10. The article of manufacture of claim 9, wherein said text elements comprise menu items, icon names, window titles, and text presented by applications.

11. The article of manufacture of claim 10, wherein said text presented by applications is text presented by inactive applications.

* * * * *

UNITED STATES PATENT AND TRADEMARK OFFICE
CERTIFICATE OF CORRECTION

| | | |
|---|---|---|
| PATENT NO. | : 8,280,193 B2 | Page 1 of 1 |
| APPLICATION NO. | : 13/045299 | |
| DATED | : October 2, 2012 | |
| INVENTOR(S) | : Benjamin D. Weiss, Richard W. Demar and Jost M. Eckhardt | |

It is certified that error appears in the above-identified patent and that said Letters Patent is hereby corrected as shown below:

On the Title Page, in Item [73], under Assignee, please insert -- D.B.A. Ai Squared --.

Signed and Sealed this
Eighteenth Day of December, 2012

David J. Kappos
*Director of the United States Patent and Trademark Office*